Patented Feb. 27, 1934

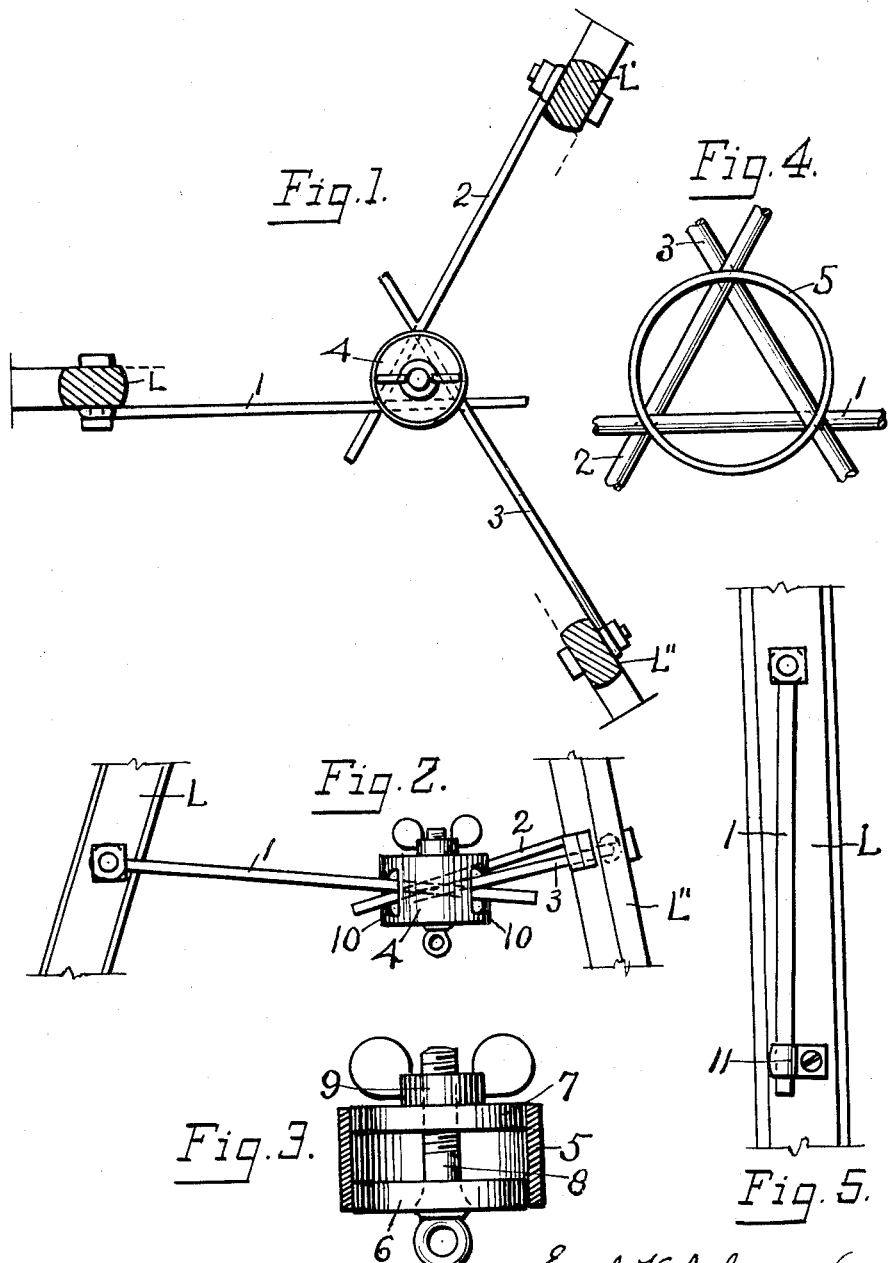

1,948,584

UNITED STATES PATENT OFFICE 1,948,584

TRIPOD STABILIZER

Earl K. Johnson, Tacoma, Wash.

Application November 11, 1932
Serial No. 642,149

1 Claim. (Cl. 248—43)

This invention relates to improved stabilizing means whereby the legs of an adjustable or collapsible tripod, especially those for supporting photographic cameras, surveying instruments, artist easels and such like, may be locked together when in an extended position and thus be held in a stable and fixed position. It is particularly designed to be used when a tripod is set up on smooth floors, or on hard frozen or icy ground when the foot of a tripod is liable to slip, or to be easily knocked out of position.

The objects of the invention are, to provide for such tripods a stabilizing device that is effective in its purpose, can be easily attached to the tripod, is inexpensive to manufacture, is of little bulk and light in weight and can be readily put aside when not required to be used.

I attain these and other objects by means of the device illustrated in the accompanying drawing, in which:—

Figure 1 is a top view of the invention shown attached to the legs of a tripod shown in section; Fig. 2 is a front view of Fig. 1; Fig. 3 is an enlarged section vertically through the center of locking device, the staying members being detached; Fig. 4 is an enlarged top view of the inclosing cylinder, the locking disks being detached to show the manner in which the staying members are to be inserted; and Fig. 5 is a partial side view of one of the tripod legs showing the staying member folded aside when not in use.

Similar parts are indicated by similar characters in each of the several views.

Referring to the drawing it will be seen that my invention comprises three staying members, 1, 2 and 3 securely and pivotally attached to the sides of the tripod legs L, L' and L'', respectively, the inner ends being engaged in triangular form within a cylindrical device 4 centrally located. This device 4 consists of a short inclosing cylinder 5 which encircles two clamping or locking disks 6 and 7, held together and operated by a central threaded screw shaft or stem 8 with a thumb screw nut 9. This inclosing cylinder 5 is provided with three vertical oblong slots 10—10 through which the staying members 1, 2 and 3 are inserted as shown in Figs. 1, 2 and 4.

Referring to Fig. 4 it will be seen that stay member 1 is inserted above member 2 and below member 3; member 2 is inserted above member 3 and below member 1; and member 3 is inserted above member 1 and below member 2. This causes each staying member to incline slightly upward to its respective leg and to a common level. This interlocking of the staying members within the cylinder 5 causes each to have a double friction contact with each other and with the clamping disks 6 and 7 as well. The clamping or locking disks are inserted within the cylinder 5 with disk 6 below and disk 7 above the members 1, 2 and 3 and the nut 9 loosely set till the tripod legs are set to the desired position, then the screw is set till the disks securely clutch and lock the stay members therein and the tripod legs will thus be held in a fixed position so no one leg can be moved, slipped or knocked without moving the others.

The stay members are designed to be made of stiff hard steel wires or small rods of suitable size, or small hard tubing may be used if desired, thus securing lightness in weight. The inclosing cylinder of the locking device may be of nickel-plated brass tubing not to exceed two inches in diameter while the disks 6 and 7 may be of any suitable metal or of a suitable composition material.

It is to be observed that if it is desired to move the tripod from place to place, the locking device 4 can be loosened and the tripod closed, the staying loosened members sliding freely through the oblong slots 10 till the legs L close in against the cylinder 5. With due care the extending inner ends of the members will not be in the way. Should the use of the stabilizer be discontinued, the stay members are to be slipped out of the locking device by spreading the legs till the locking device is free of them. The stay members are to be folded down beside their respective legs as shown in Fig. 5 with its inner end secured within a spring clip 11 and thus be out of the way. The locking device 4 can be carried in a pocket of the operator.

It is to be further observed that the center of each tripod leg is practically in radial alinement with the center of the locking device and the device can be operated with ease. It is to be further understood that I do not limit myself to the use of round steel rods for the stay members, but reserve the right to use any form of rods made of any suitable metal that will meet the strain thereon.

I am aware that prior to my invention, various forms of stabilizers for tripods have been devised and used. I therefore do not claim the idea broadly, but that which I do claim as new and useful and desire to secure by Letters Patent, is:—

In a tripod of the class described, a stabilizer, comprising a stay member pivotally fixed to each leg of said tripod, the inner ends of said stay members slidably engaged in triangular form within a central locking device having a cylindrical inclosure, and each of said stay members so inserted as to pass above one and below the other of its contacting members within the said cylindrical inclosure of said central locking device.

EARL K. JOHNSON.